(12) United States Patent
Chen

(10) Patent No.: US 8,128,042 B1
(45) Date of Patent: Mar. 6, 2012

(54) SUCKER ASSEMBLY HAVING A BETTER ATTACHMENT EFFECT

(75) Inventor: Lung-Chih Chen, Tanzih Township, Taichung County (TW)

(73) Assignee: Ferro-Carbon Ent. Co., Ltd., Taichung County (TW)

( * ) Notice: Subject to any disclaimer, the term of this patent is extended or adjusted under 35 U.S.C. 154(b) by 0 days.

(21) Appl. No.: 12/982,948

(22) Filed: Dec. 31, 2010

(51) Int. Cl.
*A45D 42/14* (2006.01)
*F16B 47/00* (2006.01)

(52) U.S. Cl. ............ 248/205.5; 248/683; 248/467; 248/206.2; 248/206.3; 248/309.3; 211/86.01; 211/106

(58) Field of Classification Search .......... 248/683, 248/467, 205.5, 206.2, 206.3, 309.3; 211/86.01, 211/106
See application file for complete search history.

(56) References Cited

U.S. PATENT DOCUMENTS

| | | | | |
|---|---|---|---|---|
| 979,436 | A | * | 12/1910 | Corbin .............. 248/205.5 |
| 993,989 | A | * | 5/1911 | Hazelrigg ........... 248/205.7 |
| 1,715,602 | A | * | 6/1929 | Jones ................ 248/205.7 |
| 2,315,566 | A | * | 4/1943 | Watral et al. ......... 211/123 |
| 5,348,168 | A | * | 9/1994 | Emery ................ 211/106 |
| 5,356,102 | A | * | 10/1994 | Blumenaus .......... 248/205.5 |
| 6,234,435 | B1 | * | 5/2001 | Yeh ................. 248/205.5 |
| 6,308,923 | B1 | * | 10/2001 | Howard ............. 248/205.5 |
| 6,352,229 | B1 | * | 3/2002 | Adams ............... 248/316.7 |
| 6,749,160 | B1 | * | 6/2004 | Richter ............. 248/206.2 |
| 6,886,792 | B2 | * | 5/2005 | Immerman ........... 248/206.3 |
| 6,932,306 | B2 | * | 8/2005 | Zou et al. .......... 248/205.5 |
| 7,066,434 | B2 | * | 6/2006 | Kwok ............... 248/205.8 |
| 7,516,926 | B2 | * | 4/2009 | Liu ................. 248/205.5 |
| 2005/0236538 | A1 | * | 10/2005 | Schmidt et al. ...... 248/205.5 |
| 2007/0152119 | A1 | * | 7/2007 | Wang ............... 248/205.5 |

* cited by examiner

*Primary Examiner* — Terrell McKinnon
*Assistant Examiner* — Michael McDuffie
(74) *Attorney, Agent, or Firm* — Alan Kamrath; Kamrath IP Lawfirm, PA (57) ABSTRACT

A sucker assembly includes a sucker, a pull bar secured on the sucker, a pressing member mounted on the pull bar and pressing the sucker, an elastic member mounted on the pull bar and biased between the sucker and the pressing member, a control handle pivotally mounted on the pressing member, and a pivot shaft extending through the control handle, the pressing member and the pull bar. The pressing member has a periphery provided with a mounting seat which has a fixing recess to receive a hanging rod of a support rack and to abut a surface. Thus, the hanging rod of the support rack is locked onto the surface by the fixing recess of the mounting seat so that the support rack contacts with the surface exactly and closely.

9 Claims, 9 Drawing Sheets

SUCKER ASSEMBLY HAVING A BETTER ATTACHMENT EFFECT

BACKGROUND OF THE INVENTION

1. Field of the Invention

The present invention relates to an attachment and, more particularly, to a sucker assembly that is attached to an object, such as a wall and the like.

2. Description of the Related Art

Figure 9:
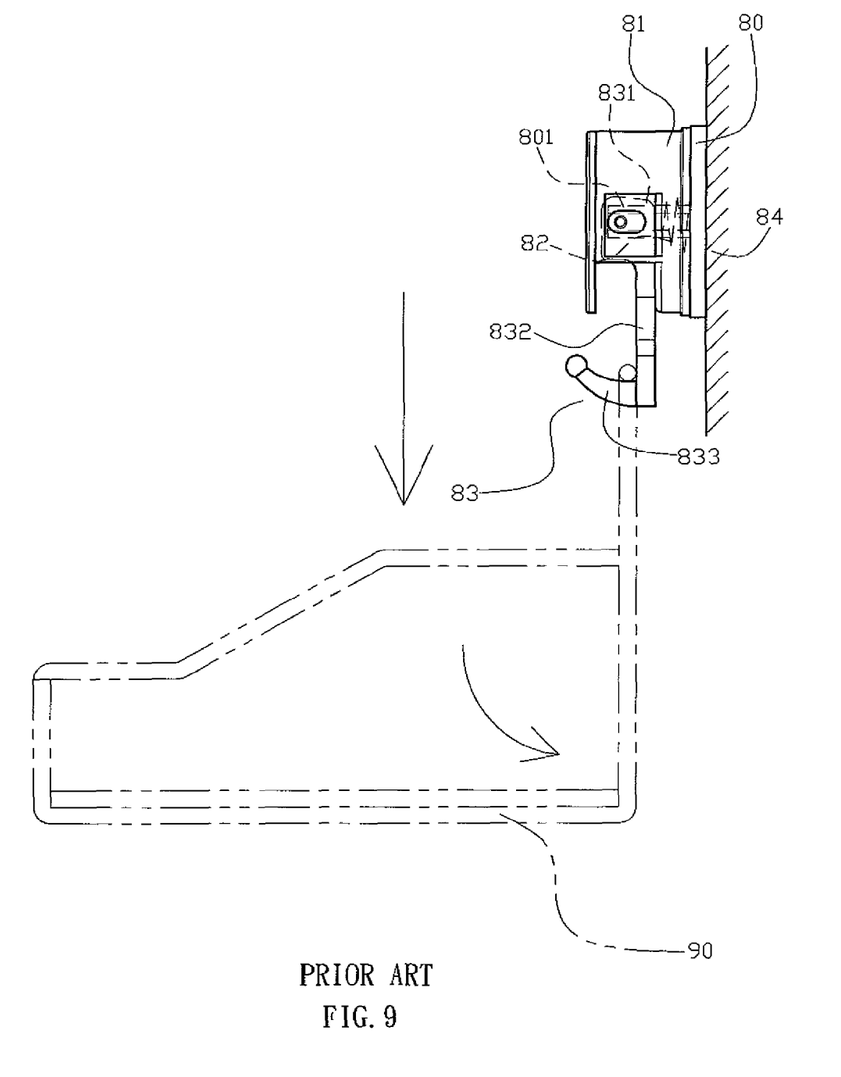
FIG. 9 is a side cross-sectional view of a conventional sucker assembly in accordance with the prior art.

A conventional sucker assembly in accordance with the prior art shown in FIG. 9 comprises a sucker 80, a pull bar 801 secured on the sucker 80, a hollow pressing member 81 mounted on the pull bar 801 and having a peripheral rim encompassing the sucker 80, an elastic member 82 mounted on the pull bar 801 and biased between the sucker 80 and the pressing member 81, and a control handle 83 having a first end provided with a pressing portion 831 pivotally mounted on the pull bar 801 in an eccentric manner and pressing the pressing member 81 and a second end provided with a driving portion 832. The pressing member 81 has a surface formed with a through hole (not shown) to allow passage of the pull bar 801. The driving portion 832 of the control handle 83 has a distal end provided with a hook portion 833 to hang a support rack 90. In operation, the sucker 80 is placed on a surface 84, such as a wall and the like. When the driving portion 832 of the control handle 83 is driven, the pressing portion 831 of the control handle 83 is pivoted about the pull bar 801 in an eccentric manner and presses the pressing member 81 to pull the pull bar 801 which pulls the sucker 80 toward the pressing member 81 so that the sucker 80 is compressed and deformed by the peripheral rim of the pressing member 81 to produce a vacuum suction force between the surface 84 and the sucker 80 so as to attach the sucker 80 to the surface 84 exactly and to attach the support rack 90 to the surface 84. However, the support rack 90 is spaced from the surface 84 so that the support rack 90 will be vibrated or swayed freely. In addition, a distance is defined between the support rack 90 and the sucker 80 so that a moment is produced between the support rack 90 and the sucker 80 so that the sucker 80 will be pulled and removed from the surface 84 due to the weight of the support rack 90.

BRIEF SUMMARY OF THE INVENTION

In accordance with the present invention, there is provided a sucker assembly, comprising a sucker, a pull bar secured on the sucker, a hollow pressing member mounted on the pull bar and pressing the sucker, an elastic member mounted on the pull bar and biased between the sucker and the pressing member, a control handle pivotally mounted on the pressing member, and a pivot shaft extending through the control handle, the pressing member and the pull bar to connect the control handle with the pull bar. The pressing member has a first side pressing the sucker. The first side of the pressing member has a periphery provided with a hollow mounting seat protruding outward from the pressing member. The mounting seat of the pressing member has an end face provided with a fixing recess.

The sucker is adapted for abutting a surface, and the fixing recess of the mounting seat is adapted for receiving a hanging rod of a support rack and is adapted for abutting the surface. The hanging rod of the support rack is locked onto the surface by the fixing recess of the mounting seat, and the support rack contacts with the surface exactly and closely.

The primary objective of the present invention is to provide a sucker assembly having a better attachment effect.

According to the primary advantage of the present invention, the fixing recess of the mounting seat is flush with the sucker and abuts the surface to eliminate the gap between the pressing member and the surface and to press the support rack toward the surface so that the support rack abuts the surface exactly and closely and will not be spaced from the surface, thereby preventing the support rack from being vibrated or swayed freely.

According to another advantage of the present invention, the support rack abuts the surface closely to eliminate the distance between the support rack and the sucker so as to prevent from producing a moment between the support rack and the sucker so that the sucker will not be pulled and removed from the surface due to the weight of the support rack.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 1-4, a sucker assembly in accordance with the preferred embodiment of the present invention comprises a sucker 40, a pull bar 41 secured on the sucker 40, a hollow pressing member 20 mounted on the pull bar 41 and pressing the sucker 40, an elastic member 30 mounted on the pull bar 41 and biased between the sucker 40 and the pressing member 20, a control handle 10 pivotally mounted on the pressing member 20, and a pivot shaft 15 extending through the control handle 10, the pressing member 20 and the pull bar 41 to connect the control handle 10 with the pull bar 41.

The pressing member 20 has a disk shape and has a first side 28 pressing the sucker 40. The first side 28 of the pressing member 20 has a periphery provided with a hollow mounting seat 26 protruding outward from the pressing member 20. The mounting seat 26 of the pressing member 20 has an end face provided with a fixing recess 261 which has a substantially C-shaped profile. The fixing recess 261 of the mounting seat 26 is located beside and flush with a periphery of the sucker 40. The sucker assembly further comprises an adjusting bushing 262 mounted in the fixing recess 261 of the mounting seat 26. The adjusting bushing 262 has a substantially C-shaped profile.

The pressing member 20 has a central portion provided with a passage 21 to allow passage of the pull bar 41. The pressing member 20 has a second side provided with a hollow protruding pivot seat 22 connected to the passage 21. The pivot seat 22 of the pressing member 20 has two opposite sidewalls each formed with an elongate guide slot 23 connected to the passage 21. The guide slot 23 of the pivot seat 22 extends in an axial direction of the pivot seat 22. The pivot seat 22 of the pressing member 20 has a periphery provided with a hanging hook 24. The hanging hook 24 of the pressing member 20 has a distal end provided with a ball 27 and has a side provided with a pressing lug 25. The pressing lug 25 of the pressing member 20 has an arcuate shape and is located beside the fixing recess 261 of the mounting seat 26.

The control handle 10 pivotally mounted on the pivot seat 22 of the pressing member 20 and has a first end provided with an eccentric pivot portion 11 which is pivotally mounted on the pivot shaft 15 in an eccentric manner and is movable to press the pressing member 20 to move the pressing member 20 toward the sucker 40. The control handle 10 has a second end provided with a driving portion 14. The pivot portion 11 of the control handle 10 has a substantially forked shape and has an inner portion formed with a receiving recess 12 to receive the pivot seat 22 of the pressing member 20. The pivot portion 11 of the control handle 10 functions as a cam and has two opposite sidewalls each formed with a pivot hole 13 pivotally mounted on the pivot shaft 15 in an eccentric manner. The pivot hole 13 of the pivot portion 11 is connected to the receiving recess 12.

The pull bar 41 is movably mounted in the passage 21 of the pressing member 20 and the pivot seat 22 of the pressing member 20. The pull bar 41 has a first end secured on the sucker 40 and a second end formed with a fixing hole 42 to allow passage of the pivot shaft 15. The fixing hole 42 of the pull bar 41 is aligned with the guide slot 23 of the pivot seat 22.

The pivot shaft 15 in turn extends through the pivot hole 13 of the control handle 10, the guide slot 23 of the pivot seat 22 and the fixing hole 42 of the pull bar 41 to pivotally connect the control handle 10 with the pivot seat 22 of the pressing member 20 and the pull bar 41 and to attach the pull bar 41 to the pivot seat 22 of the pressing member 20. The pivot shaft 15 is movable in the guide slot 23 of the pivot seat 22.

Figure 1:
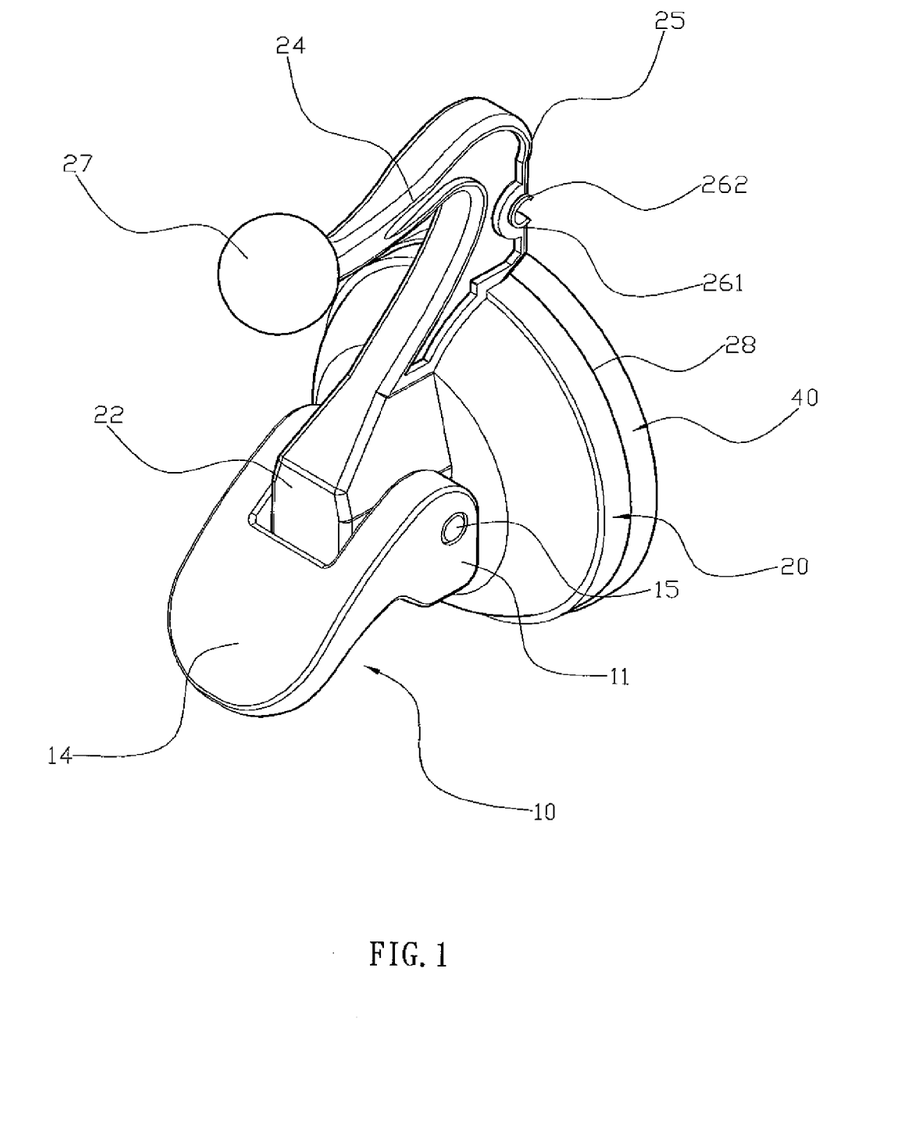
FIG. 1 is a perspective view of a sucker assembly in accordance with the preferred embodiment of the present invention.
Figure 2:
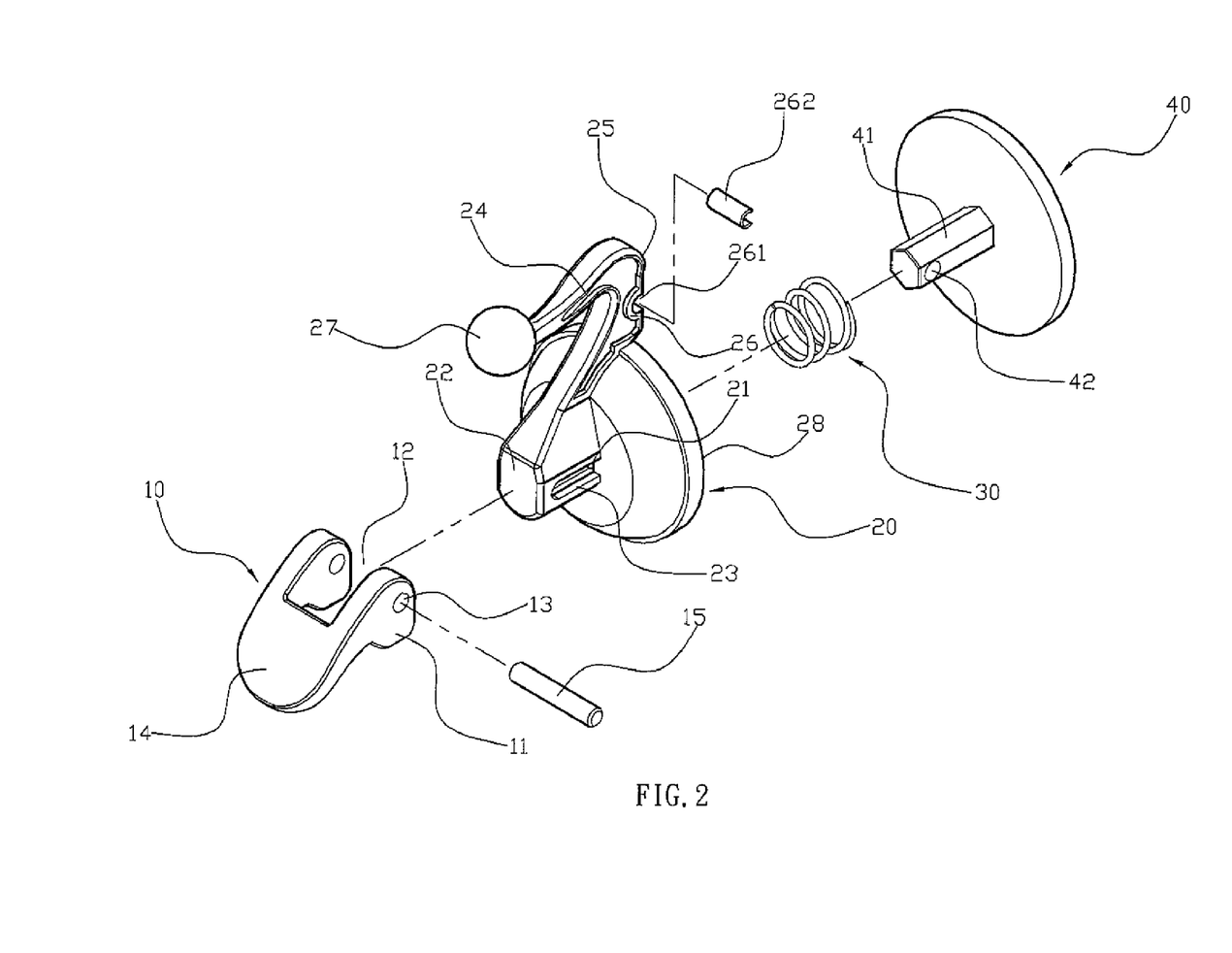
FIG. 2 is an exploded perspective view of the sucker assembly as shown in FIG. 1.
Figure 3:
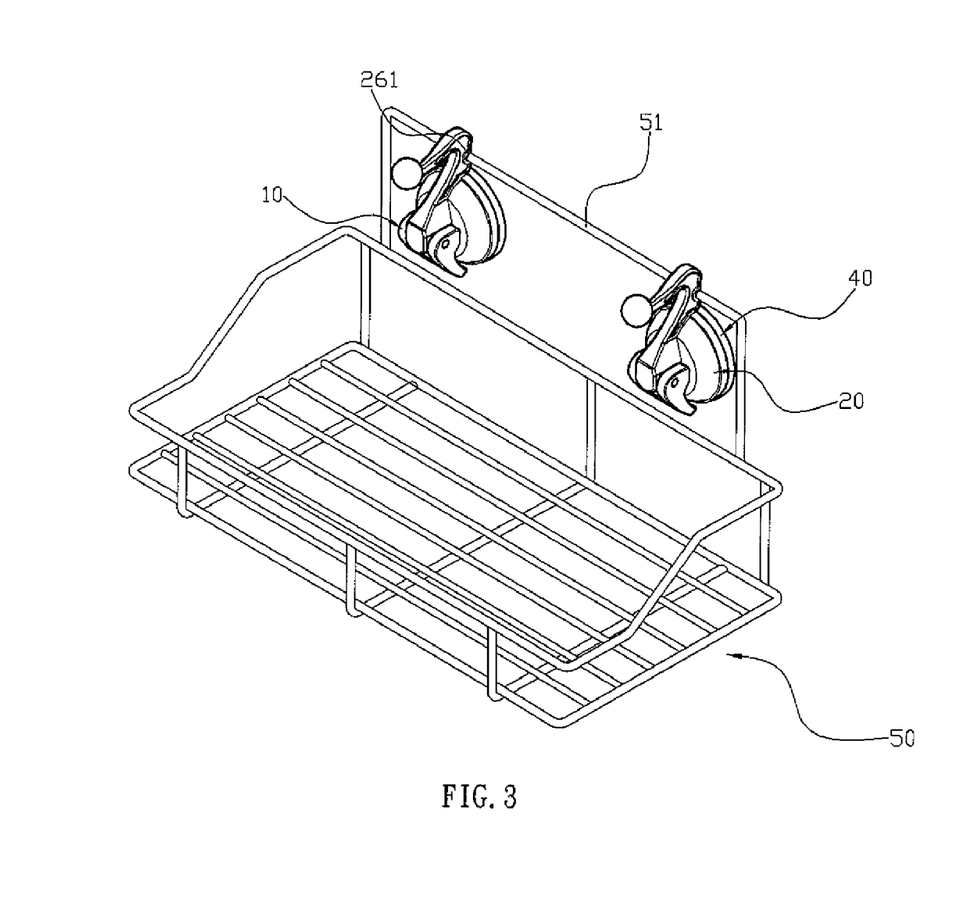
FIG. 3 is a schematic operational view of the sucker assembly as shown in FIG. 1 in use.
Figure 4:
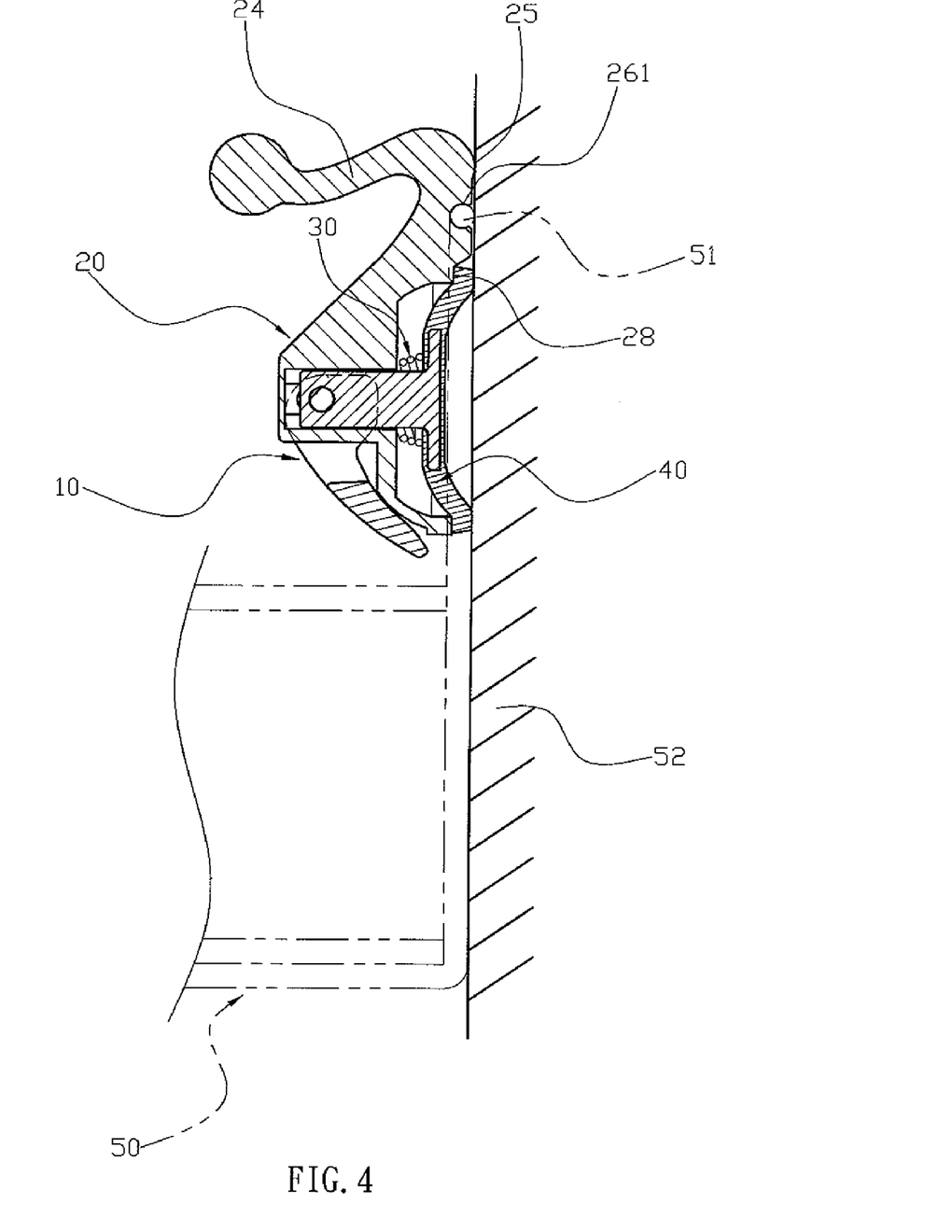
FIG. 4 is a side cross-sectional view of the sucker assembly as shown in FIG. 3.

In operation, referring to FIGS. 3 and 4 with reference to FIGS. 1 and 2, the sucker 40 is adapted for abutting a surface 52, such as a vertical wall and the like, and the fixing recess 261 of the mounting seat 26 is adapted for receiving a hanging rod 51 of a support rack 50 and is adapted for abutting the surface 52. In such a manner, when the driving portion 14 of the control handle 10 is driven, the pivot portion 11 of the control handle 10 is pivoted about the pivot shaft 15 in an eccentric manner and presses the pressing member 20 to pull the pull bar 41 toward the pivot seat 22 of the pressing member 20 and to pull the sucker 40 toward the pressing member 20 so that the sucker 40 is compressed and deformed by the first side 28 of the pressing member 20 to produce a vacuum suction force between the surface 52 and the sucker 40 so as to attach the sucker 40 to the surface 52 exactly and to attach the support rack 50 to the surface 52. Thus, the support rack 50 is located between the pressing member 20 and the surface 52. At this time, the hanging rod 51 of the support rack 50 is locked onto the surface 52 by the fixing recess 261 of the mounting seat 26 to contact the support rack 50 with the surface 52 exactly and closely so as to prevent the support rack 50 from being spaced from the surface 52 so that the support rack 50 is supported by the surface 52 solidly and stably. In addition, the fixing recess 261 of the mounting seat 26 is flush with the sucker 40 and abuts the surface 52 to eliminate the gap defined between the pressing member 20 and the surface 52 so that the support rack 50 abuts the surface 52 exactly and closely and will not be vibrated or swayed freely. Further, the support rack 50 abuts the surface 52 to eliminate the distance between the support rack 50 and the sucker 40 so as to prevent from producing a moment between the support rack 50 and the sucker 40 so that the sucker 40 will not be pulled and removed from the surface 52 due to the weight of the support rack 50.

As shown in FIG. 4, the hanging hook 24 of the pressing member 20 is disposed above the pressing member 20.

Figure 5:
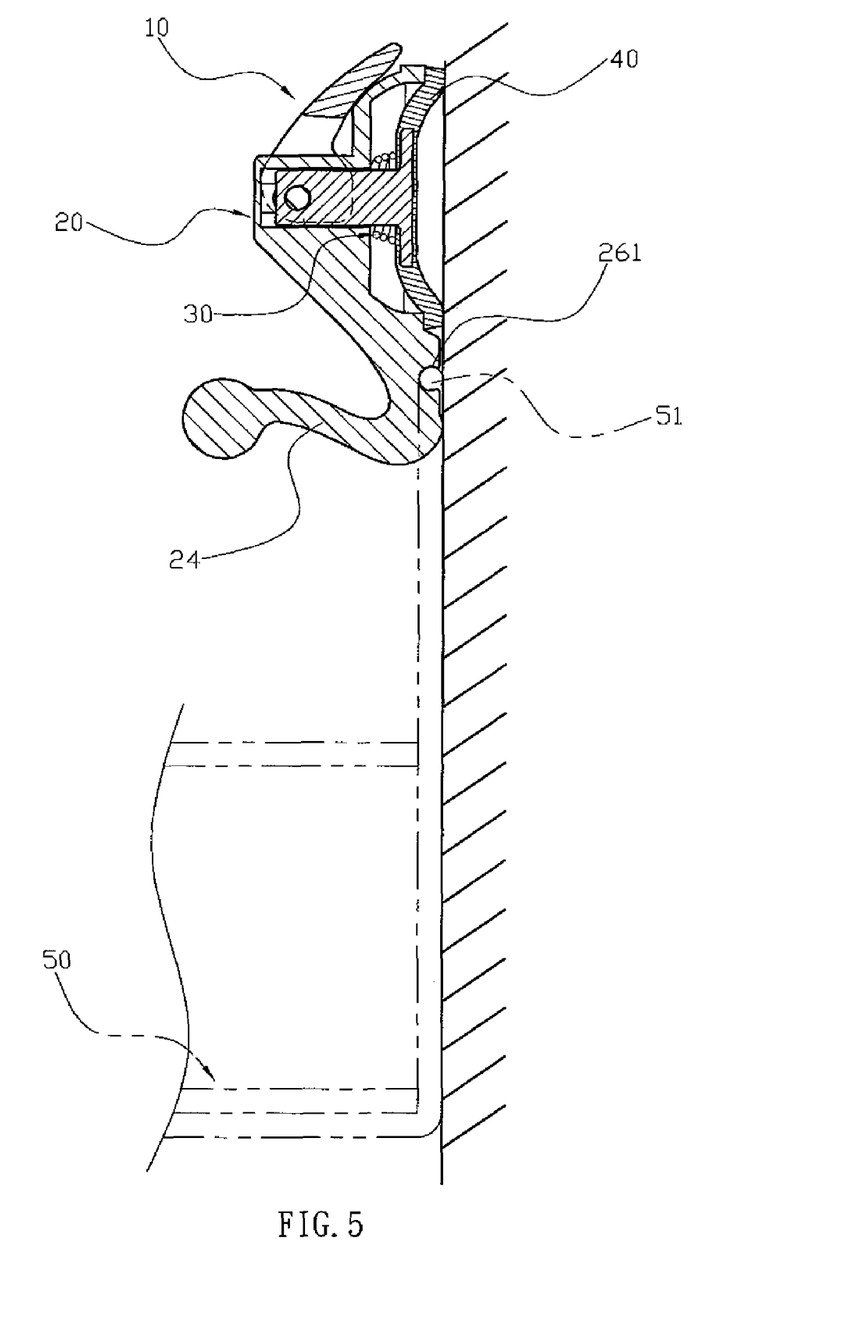
FIG. 5 is a side cross-sectional view of the sucker assembly in accordance with another preferred embodiment of the present invention.

As shown in FIG. 5, the hanging hook 24 of the pressing member 20 is disposed under the pressing member 20.

Figure 6:
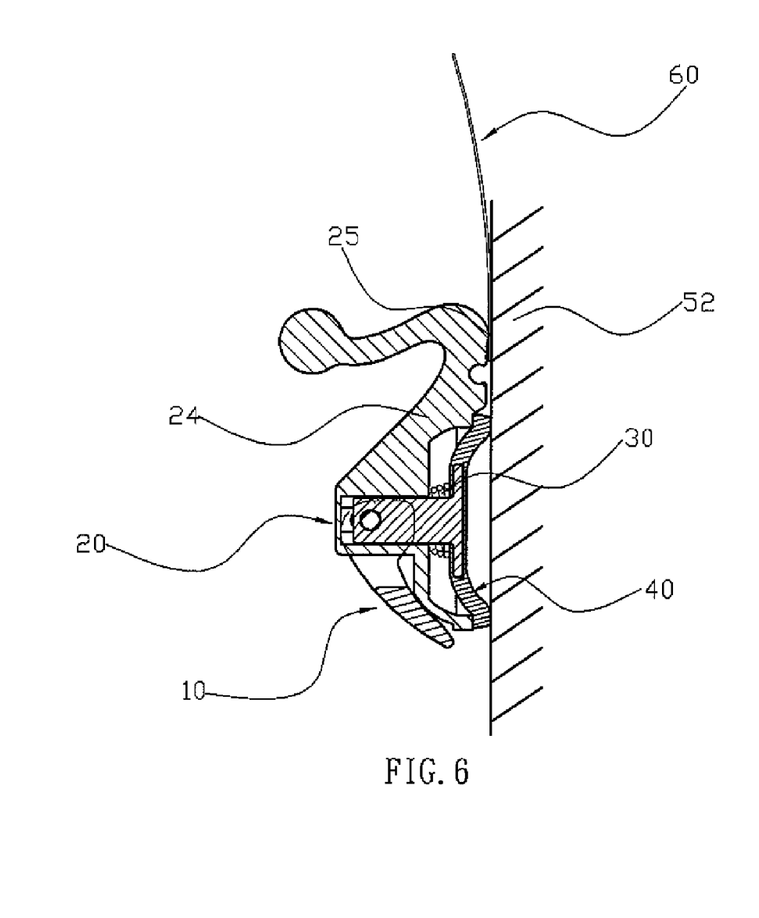
FIG. 6 is a side cross-sectional view of the sucker assembly in accordance with another preferred embodiment of the present invention.

As shown in FIG. 6, the pressing lug 25 of the pressing member 20 is adapted for abutting the surface 52 to clamp a sheet of paper 60 between the pressing lug 25 of the pressing member 20 and the surface 52.

Figure 7:
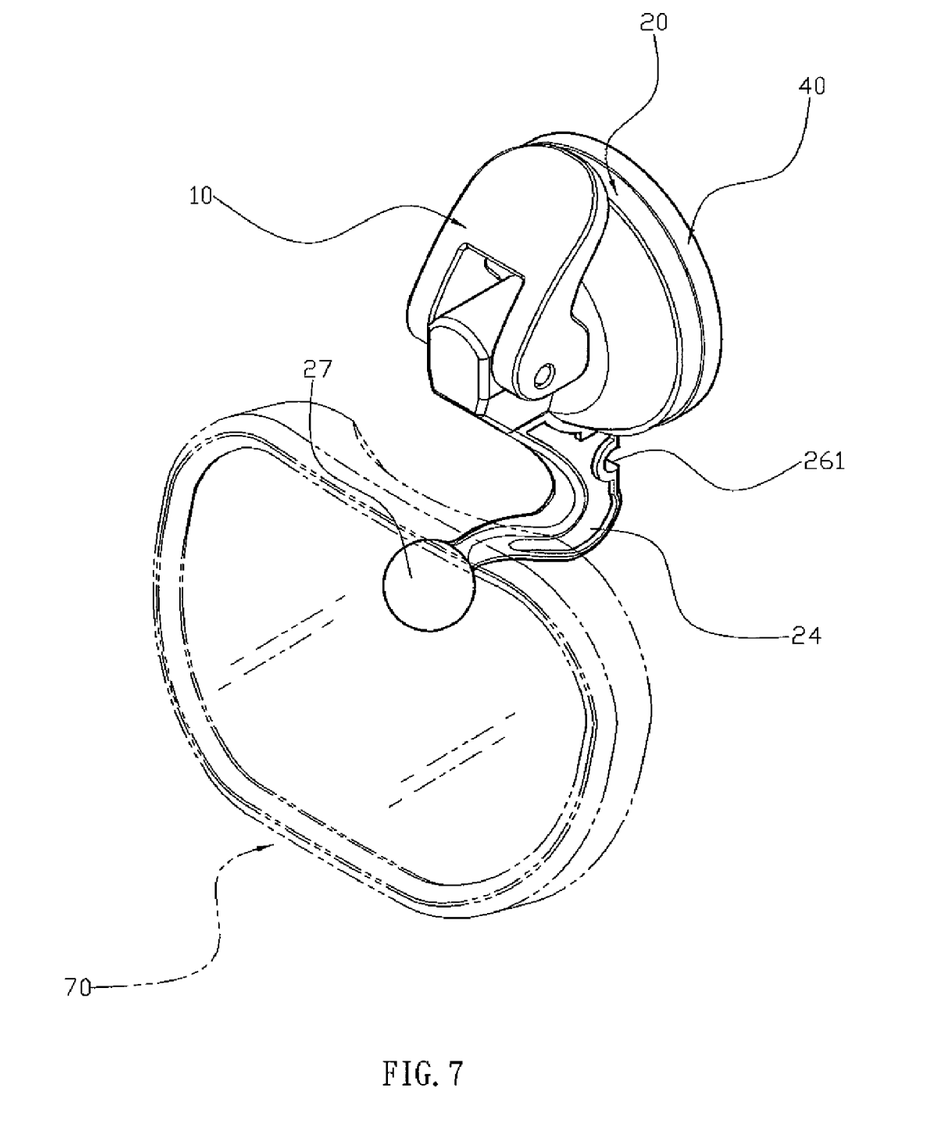
FIG. 7 is a perspective view of the sucker assembly in accordance with another preferred embodiment of the present invention.

As shown in FIG. 7, the ball 27 of the hanging hook 24 is used to hang a mirror 70.

As shown in FIGS. 1-7, the mounting seat 26 of the pressing member 20 is integrally combined with the hanging hook 24.

Figure 8:
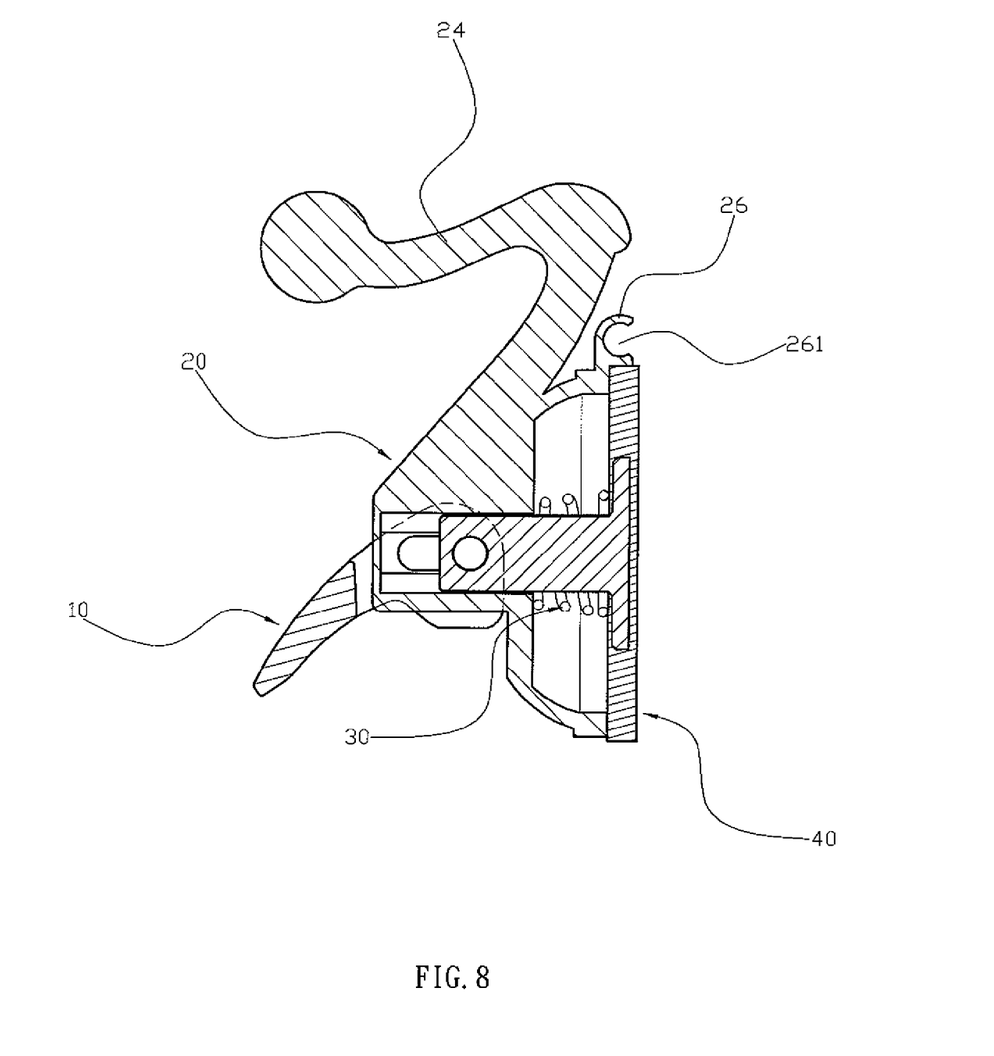
FIG. 8 is a side cross-sectional view of the sucker assembly in accordance with another preferred embodiment of the present invention.

As shown in FIG. 8, the mounting seat 26 of the pressing member 20 is spaced from the hanging hook 24.

Accordingly, the fixing recess 261 of the mounting seat 26 is flush with the sucker 40 and abuts the surface 52 to eliminate the gap between the pressing member 20 and the surface 52 and to press the support rack 50 toward the surface 52 so that the support rack 50 abuts the surface 52 exactly and closely and will not be spaced from the surface 52, thereby preventing the support rack 50 from being vibrated or swayed freely. In addition, the support rack 50 abuts the surface 52 closely to eliminate the distance between the support rack 50 and the sucker 40 so as to prevent from producing a moment between the support rack 50 and the sucker 40 so that the sucker 40 will not be pulled and removed from the surface 52 due to the weight of the support rack 50.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:
1. A sucker assembly, comprising:
a sucker;
a pull bar secured on the sucker;
a hollow pressing member mounted on the pull bar and pressing the sucker;
an elastic member mounted on the pull bar and biased between the sucker and the pressing member;
a control handle pivotally mounted on the pressing member; and
a pivot shaft extending through the control handle, the pressing member and the pull bar to connect the control handle with the pull bar;
wherein the pressing member has a first side pressing the sucker;

the first side of the pressing member has a periphery provided with a hollow mounting seat protruding outward from the pressing member;

the mounting seat of the pressing member has an end face provided with a fixing recess;

the sucker assembly further comprises an adjusting bushing mounted in the fixing recess of the mounting seat.

2. The sucker assembly of claim 1, wherein the fixing recess of the mounting seat is located beside and flush with a periphery of the sucker.

3. The sucker assembly of claim 1, wherein the fixing recess of the mounting seat has a substantially C-shaped profile.

4. The sucker assembly of claim 1, wherein the adjusting bushing has a substantially C-shaped profile.

5. A sucker assembly, comprising:

a sucker;

a pull bar secured on the sucker;

a hollow pressing member mounted on the pull bar and pressing the sucker;

an elastic member mounted on the pull bar and biased between the sucker and the pressing member;

a control handle pivotally mounted on the pressing member; and a pivot shaft extending through the control handle, the pressing member and the pull bar to connect the control handle with the pull bar;

wherein the pressing member has a first side pressing the sucker;

the first side of the pressing member has a periphery provided with a hollow mounting seat protruding outward from the pressing member;

the mounting seat of the pressing member has an end face provided with a fixing recess;

the pressing member has a disk shape;

the pressing member has a central portion provided with a passage to allow passage of the pull bar;

the pressing member has a second side provided with a hollow protruding pivot seat connected to the passage;

the pivot seat of the pressing member has two opposite sidewalls each formed with an elongate guide slot connected to the passage;

the guide slot of the pivot seat extends in an axial direction of the pivot seat;

the control handle pivotally mounted on the pivot seat of the pressing member and has a first end provided with an eccentric pivot portion which is pivotally mounted on the pivot shaft in an eccentric manner and is movable to press the pressing member to move the pressing member toward the sucker;

the control handle has a second end provided with a driving portion;

the pivot portion of the control handle has an inner portion formed with a receiving recess to receive the pivot seat of the pressing member;

the pivot portion of the control handle has two opposite sidewalls each formed with a pivot hole pivotally mounted on the pivot shaft in an eccentric manner;

the pivot hole of the pivot portion is connected to the receiving recess;

the pull bar is movably mounted in the passage of the pressing member and the pivot seat of the pressing member;

the pull bar has a first end secured on the sucker and a second end formed with a fixing hole to allow passage of the pivot shaft;

the fixing hole of the pull bar is aligned with the guide slot of the pivot seat;

the pivot shaft in turn extends through the pivot hole of the control handle, the guide slot of the pivot seat and the fixing hole of the pull bar to pivotally connect the control handle with the pivot seat of the pressing member and the pull bar and to attach the pull bar to the pivot seat of the pressing member;

the pivot shaft is movable in the guide slot of the pivot seat the pivot seat of the pressing member has a periphery provided with a hanging hook;

the hanging hook of the pressing member has a side provided with a pressing lug;

the pressing lug of the pressing member has an arcuate shape and is located beside the fixing recess of the mounting seat;

the pressing lug of the pressing member is adapted for abutting a surface to clamp a sheet of paper between the pressing lug of the pressing member and the surface.

6. The sucker assembly of claim 1, wherein the sucker is adapted for abutting a surface;

the fixing recess of the mounting seat is adapted for receiving a hanging rod of a support rack and is adapted for abutting the surface;

the hanging rod of the support rack is locked onto the surface by the fixing recess of the mounting seat;

the support rack contacts with the surface exactly and closely.

7. The sucker assembly of claim 5, wherein the hanging hook of the pressing member has a distal end provided with a ball.

8. The sucker assembly of claim 5, wherein the mounting seat of the pressing member is integrally combined with the hanging hook.

9. The sucker assembly of claim 5, wherein the mounting seat of the pressing member is spaced from the hanging hook.

* * * * *